July 11, 1939.  J. HORNACK  2,165,754
MOTION TRANSMITTING AND CONTROL APPARATUS
Filed Sept. 26, 1936  2 Sheets-Sheet 1
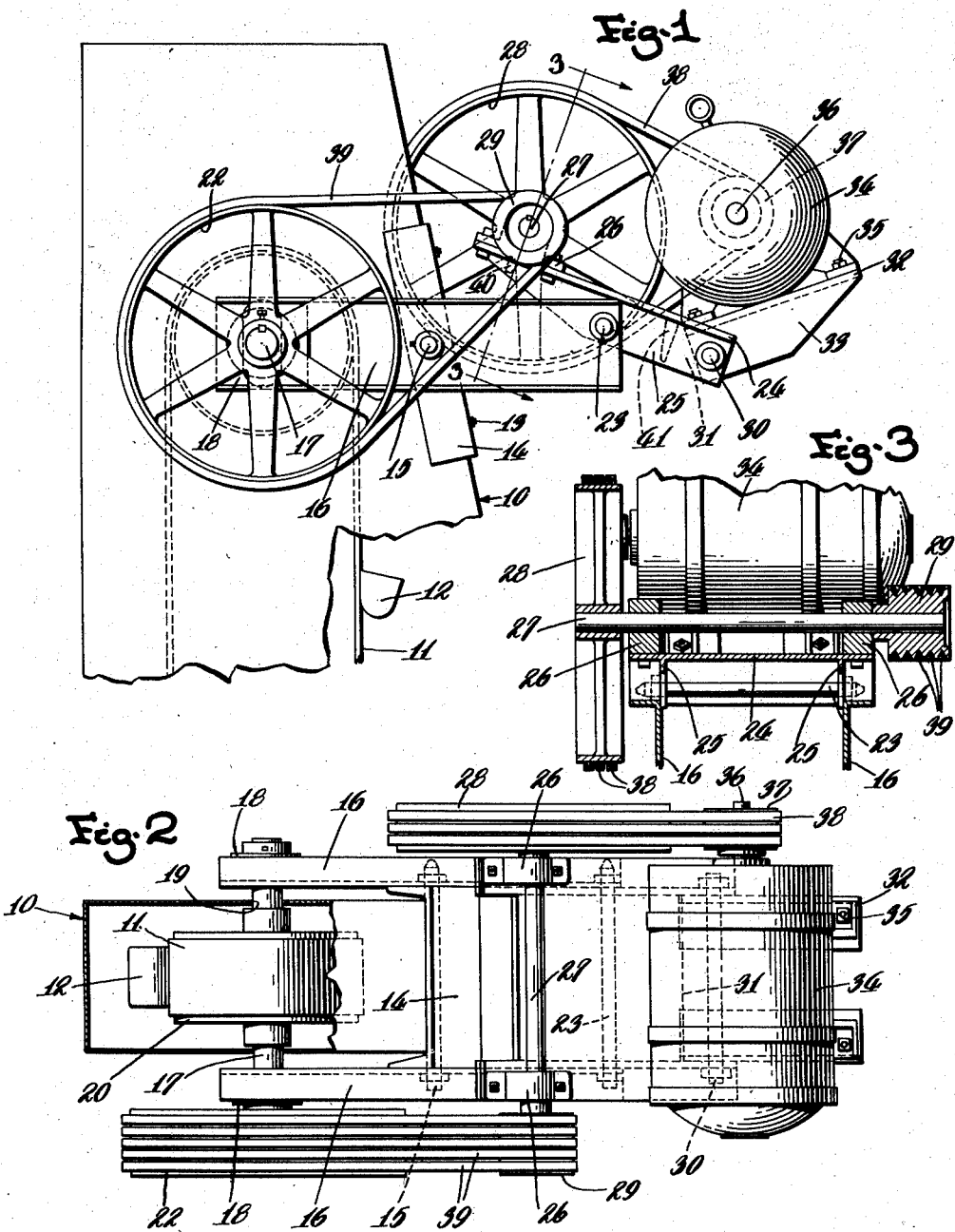
John Hornack
INVENTOR
By Freeman, Swett, Albrecht and Weidman
ATTORNEYS

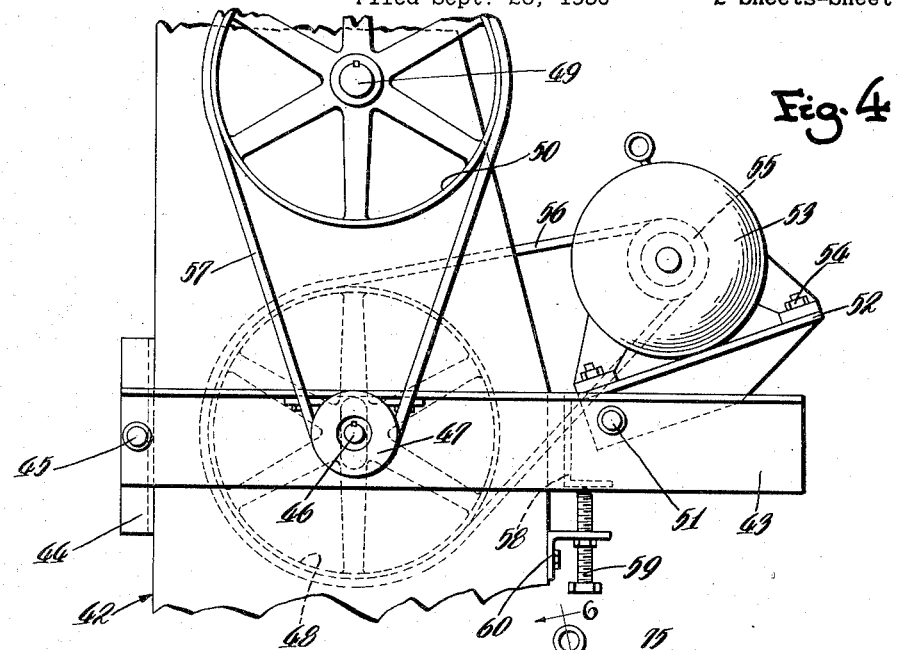

Patented July 11, 1939

2,165,754

UNITED STATES PATENT OFFICE 2,165,754

MOTION TRANSMITTING AND CONTROL APPARATUS

John Hornack, Cleveland, Ohio, assignor of one-half to Michael Kacur, Lorain, Ohio Application September 26, 1936, Serial No. 102,657

14 Claims. (Cl. 74—242.15)

This invention relates to motion transmitting and control apparatus, more particularly to apparatus transmitting motion to operate mechanism where coordination between the driving means and the driven means is desirable, and the principal object of this invention is to provide new and improved apparatus of this type.

In the drawings accompanying this specification and forming a part of this application, I have shown for purposes of illustration, several forms which my invention may assume, and in these drawings:

Figure 1 is an elevational view of one form which this invention may assume, parts thereof being fragmentarily shown, Figure 2 is a plan view of the apparatus shown in Figure 1, parts being broken away to better illustrate the mechanism, Figure 3 is a sectional view corresponding generally to the line 3—3 of Figure 1, Figure 4 is an elevational view of another embodiment of this invention, parts being fragmentarily shown, Figure 5 is a fragmentary elevational view disclosing still another embodiment of this invention, Figure 6 is a sectional view corresponding generally to the line 6—6 of Figure 5, and Figure 7 is a somewhat diagrammatic view disclosing apparatus with which this invention may cooperate.

Referring to Figures 1 through 3, the embodiment of the invention therein shown comprises a supporting housing 10, which may assume any desired form, the form illustrated in Figures 1 and 2 being that of a chambered member enclosing a belt 11 on which are provided a plurality of buckets 12. Secured to the housing 10, as by means of bolts 13, is a bracket 14, herein shown as being of channel formation and overlying one side of the housing 10.

A shaft 15 passes through the bracket 14, and the ends of the shaft project away from the side members of the bracket. Journaled on each end of the shaft 15 are supporting arms 16, and as here shown, the supporting arms are journaled on the shaft 15 intermediate their extremities, and are disposed on opposite sides of the housing 10. The supporting arms 16 are preferably of channel formation, and a shaft 17, journaled in bearings 18 provided at one set of extremities of the arms 16, passes through the housing 10, elongated apertures 19 in the side walls of the housing 10 providing for movement of the shaft 17. A pulley 20, disposed within the housing 10, is fixedly secured to the shaft 17. The belt 11 carrying the buckets 12 is trained over the pulley 20, and over another pulley spaced therefrom, for driving mechanism not shown in Figures 1 through 3. Exteriorly of the casing 10, and at one side thereof, the shaft 17 has fixedly secured thereto a large pulley 22.

The other set of extremities of the supporting arms 16 is provided with a shaft 23, extending from one arm to the other. Journaled on the shaft 23, and within the confines of the arms 16, is a supporting platform 24, here shown as having angular downwardly directed portions 25 providing means whereby the supporting platform 24 may be journaled to the shaft 23. As shown, the supporting platform 24 is journaled intermediate its extremities, one extremity of the supporting platform being provided with spaced pillow-blocks 26, providing suitable journaling means for a shaft 27 which extends through the pillow-blocks 26, and has its ends projecting away from each pillow-block. Fixedly mounted on one end of the shaft 27 is a large pulley 28, and fixedly mounted on the other end of the shaft 27 is a small pulley 29.

The other extremity of the supporting platform 24 is provided with a shaft 30 extending between the angular downwardly directed portions 25, and adjacent this extremity, the platform is recessed as shown at 31, to provide space for a motor support 32, this latter support being provided with angular walls 33, which receive the shaft 30 in journaling relation, thereby providing a pivoted connection between the supporting platform 24 and the motor support 32. An electric motor 34 is fixed to the support 32, by means of bolts 35, and as best shown in Figure 1, the support 32 is constructed and arranged with respect to the supporting platform 24, so that the weight of the motor 34 tends to urge the platform 32 about its pivot 30 in a clockwise direction.

Secured to the motor armature shaft 36, is a small pulley 37, and a belt 38 is trained over the motor pulley 37, and the large pulley 28 carried by the shaft 27. A belt 39 is trained over the small pulley 29 carried by the shaft 27, and the large pulley 22 carried by the shaft 17. The belts 38 and 39, as shown in Figures 1 and 2 comprise a series of V-belts, forming a plurality of bands effecting motion transmission from one pulley to the other pulley. The small pulleys 29 and 37, are here shown as being grooved to receive the respective V-belts 38 and 39, whereas the large pulleys 22 and 28 are shown to be provided with substantially flat peripheral faces, it being desirable to groove at least the small pulleys 29 and 37, so as to provide additional engaging surfaces. However, it will be understood that all the pulleys may have their belt engaging faces either flat or grooved or otherwise formed, and that flat belts, single or plural, may be used or any other suitable connecting bands may be substituted for the belts 38 and 39. It is to be pointed out here that the pulleys 20, 22, 28, 29, and 37 need not take the form particularly shown in Figures 1 and 2, but may assume other forms, such as sprocket wheels, in which case sprocket chains would be substituted for the belts 11, 38 and 39.

With the construction shown in Figures 1 and 2, and assuming that the parts have been assembled as hereinbefore specified, the weight of the motor 34 urges the supporting platform 32 to swing about the shaft 30 in a direction away from the shaft 27, and the belt 38 extending between the pulleys 28 and 37 is maintained properly tensioned at all times by the urging force produced by the weight of the motor 34. The weight of the motor 34 additionally urges the supporting platform 24 to pivot in a clockwise direction about the shaft 23, and this urging force causes the shaft 27 to swing away from the shaft 17, and thereby properly tensions the belt 39 extending between the pulleys 22 and 29. Additionally the weight of the motor 34 urges the arms 16 to pivot about the shaft 15, and thereby properly tensions the belt 11 which passes over the pulley 20 carried by the shaft 17.

From the foregoing it will be obvious that the weight of the motor, through the medium of the mechanism disclosed, maintains the belts 11, 38, and 39 in effective operative relation. Other ways in which the pulley 37, for example, may be mounted and biased to attain the desired result will readily suggest themselves to those skilled in the art.

The supporting platform 24 may be provided with an abutment 40 to limit the swinging movement of the adjacent end of the platform 24 toward the arms 16, and the other extremity of the platform 24 adjacent the recessed part 31, may be provided with a transversely extending angular part 41 which functions to limit the swinging movement of the motor 34 about its pivot 30.

Referring to Figure 4, the embodiment of the invention therein shown comprises a supporting housing 42, similar to the housing 10. A pair of arms 43 is provided, each arm being disposed adjacent one side of the housing 42, and in this instance, each of the arms 43 is preferably inverted L-shaped in cross-section. The housing 42 is provided with a bracket 44, carrying a shaft 45 to which is pivoted one set of extremities of the arms 43.

A shaft 46 is journaled to the arms 43, intermediate the extremities thereof, this shaft passing through elongated slots in the housing 42, and its ends extending away from the respective arms 43. One end of the shaft 46 carries a small pulley 47, and the other end of the shaft 46 carries a large pulley 48. The housing 42 is provided with suitable bearing means for journaling a shaft 49 spaced from the shaft 46, the shaft 49 carrying a large pulley 50 exteriorly of the housing 42, and may also carry an additional pulley (not shown) to accommodate a belt similar to the belt 11 of the embodiment shown in Figures 1 and 2. The bearings journaling the shaft 49 may be manually adjustable, if desired, so as to provide means for shifting the shaft 49 relative to the housing, for the purpose of adjusting a belt carried by the pulley.

A shaft 51 is carried by the other set of extremities of the arms 43, and journaled on the shaft 51, intermediate the arms 43, is a motor supporting bracket 52, to which is secured a motor 53 by means of bolts 54. The motor 53 carries a small pulley 55 on its armature shaft, and a belt 56 is trained over the pulley 5, and the large pulley 48 carried by the shaft 46. A belt 57 is trained over the small pulley 47 carried by the shaft 46, and the large pulley 50 carried by the shaft 49.

As before, the motor mounting is such that the weight of the motor urges the motor support bracket 52 to pivot about the shaft 51 in a direction away from the shaft 46. An angle piece 58 is secured to the arms 43, and cooperates with an adjustable screw 59 which is threaded into a bracket 60 carried by the housing 42, to provide an adjustable stop for the arms 43. It will be appreciated that the urging force produced by the weight of a motor will urge the supporting bracket 52 to swing about its pivot 51 to properly tension the belt 56, and the weight of the motor 53 will also act on the arms 43, to cause these arms to pivot about the shaft 45, and thereby properly tension the belt 57.

Referring to Figures 5 and 6, the embodiment of the invention therein shown comprises a housing 61, which may be similar to the housing 42, the embodiment also having spaced arms 62, which may be similar to the arms 43. The motor 63, in this instance, is secured to a swingable platform 64, this platform having angular side pieces 65 provided with apertures through which trunnions 66 extend, the axis of the trunnions coinciding with the axis of the motor armature shaft, as best shown in Figure 5. A pair of supporting brackets 67 is provided, each bracket having a down-turned portion 68 disposed within the confines of the arms 62, and having an upwardly extending portion 69 provided with an aperture for receiving the respective trunnion 66, and means, such as cotter pins 70, or the like, may be provided to hold the trunnions 66 in position. A shaft 71 extends across the arms 62, and the down-turned portions 68 of the supporting brackets 67 are journaled on the shaft 71, the shaft 71 being in off-center relation with the axis of the motor 63, so that the weight of the motor tends to swing the motor supporting assembly in a clockwise direction as viewed in Figure 5. Extending from the swingable platform 64 is an arm 72, the extremity of which is connected to a movable lever 73 which actuates a valve disposed in the valve casing 74. The motor armature shaft may be provided with a pulley 75, over which is trained a belt 76, and this belt may be trained over a pulley 77, which may be similar to the pulley 48 hereinbefore described. From the foregoing it will be appreciated that the belt 76 will be properly tensioned by the urging force produced by the off-center relation of the motor 63.

The embodiment shown in Figures 5 and 6 may be employed in the construction shown in Figures 1 through 3, or the construction shown in Figure 4, the downturned portions 68 being readily arranged to be journaled on either of the shafts 30 or 51 hereinbefore referred to.

The full line position of the motor 63, the arm 72, and the lever 73, indicates the position of the parts when the motor is not operating, but as soon as the motor is caused to operate, the torque of the motor 63 will swing the supporting cradle 64 about the trunnions 66, to cause the cradle 64, the arm 72, and the lever 73, to assume the position shown in dotted lines in Figure 5, and thereby actuate the valve so as to control flow through the valve casing 74. The motor 63, or its support, may be constructed and arranged to assume the position shown in full lines, when the motor is not running, or any other suitable means may be provided to effect this movement. Obviously, when the parts are moved from the dotted line position to the full line position, the lever 73 will actuate the valve in the casing 74 to a different position. Instead of the valve casing 74, a signaling device may be substituted to indicate whether or not the motor 63 is operating.

In Figure 7 is shown an apparatus which may be used with the embodiments hereinbefore described, this apparatus relating particularly to sand blasting mechanism, and comprising a sand blasting chamber 78, in which materials to be worked are placed. These materials are subjected to a blast of sand and air under pressure, which may issue from a nozzle 79 within the sand blasting chamber 78. The sand blasting chamber 78 is provided with a grating 80 through which the residue from the sand blasting chamber may pass to a hopper 81. At the bottom of the hopper 81 is provided a conveying screw 82, which conveys the residue to the lower end of a housing 83, which may take the form of the housings 10, 42, and 61 hereinbefore described. At the lower end of the housing 83 is journaled a shaft carrying a pulley 84, over which is trained a bucket belt 85. The shaft carrying the pulley 84 is connected to the shaft supporting the conveying screw 82.

Adjacent the top portion of the housing 83, there is provided a shaft carrying a pulley 86 within the housing 83, and also a pulley 87 exteriorly of the housing 83, and the bucket belt 85 is trained over the pulley 86. A second shaft is also disposed adjacent the upper end of the housing 83, this shaft carrying a small pulley 88, and a large pulley 89, and a belt 90 is trained over the small pulley 88 and the large pulley 87. It will be appreciated that the pulley arrangements at the upper end of the housing 83 may correspond to the arrangements shown in Figures 1 through 6.

The buckets on the belt 85 pick up the residue delivered by the screw 82 to the lower end of the housing 83, and carry this residue upwardly to a collecting vessel 91, from whence the residue is conveyed to a storage receptacle 92, suitable means being interposed for classifying the residue so that practically only sand is conveyed to the storage receptacle 92. A conduit 93, conveying air under pressure, communicates with the upper portion of the storage receptacle 92, and this air forces the sand in the storage receptacle 92 through an aperture in the lower end of the receptacle, to a mixing device 94. The conduit 93 has a branch 95 leading to the mixing device 94 so as to thoroughly mix the sand leaving the receptacle 92 with air under pressure. This mixture is conveyed through a conduit 96 to the nozzle 79 in the sand blasting chamber 78. A valve 97 is interposed in the conduit 93 for the purpose of controlling flow of air through the conduit.

Assuming that the pulley arrangement at the upper end of the housing 83 corresponds to the construction shown in either Figures 1 through 3, or Figure 4, and assuming that the valve 97 is suitably connected to the motor as shown in Figures 5 and 6, any foreign material dropping into the screw conveyer 82 which might tend to stop this conveyer, to thereby cause the motor to stall, or if the motor is stalled for any other reason, the arm and lever mechanism actuated by the swinging movement of the motor cradle support, as shown in Figures 5 and 6, would cause the valve to close and interrupt the supply of air to the storage receptacle 92. On the other hand, as soon as the motor is caused to operate, the torque of the motor will cause the motor cradle support to swing about the trunnions and move the valve to open position.

This particular feature is particularly advantageous in sand blasting operations, where the noise of the operation is so great that the operator cannot hear whether or not the sand conveying system is operating. Therefore it will be obvious that no parts of the conveying system can be broken by foreign material, and additionally, an excessive amount of sand will not be piled up in the chamber 81 before the operator is aware of the stoppage of the driving means for the conveyer system.

It will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. In combination: a first support, pivoted intermediate its ends; a first shaft journaled adjacent one end of said first support, said first shaft carrying a plurality of pulleys; a belt trained over one of said plurality of pulleys for driving mechanism spaced therefrom; a second support, pivoted intermediate its ends to said first support adjacent the other end of said first support; a second shaft journaled adjacent one end of said second support and carrying a plurality of pulleys; a motor supported adjacent the other end of said second support, and constructed and arranged to urge said one end of said second support away from said first shaft, said motor being provided with a pulley; a belt trained over said motor pulley and one of said pulleys carried by said second shaft; and a belt trained over the other of said pulleys carried by said second shaft and the other of said pulleys carried by said first shaft.

2. In a motion transmission apparatus, a first pivoted member; a second member pivoted to said first member; a motor pivoted to said second member, and having a first pulley wheel, said motor being constructed and arranged to normally urge said first member in one direction about its pivot; a second pulley wheel rotatable about a shaft carried by said second member; first belt means, about said first and second pulley wheels, said second pulley wheel and said motor being so positioned with respect to each other that said first belt means holds said motor in a position about its pivot wherein the weight of the motor tensions said belt; a third pulley wheel, rotatable about a shaft carried by said first member; and second belt means, establishing driving relation between said second pulley wheel and said third pulley wheel, said third pulley wheel being so positioned with respect to said second pulley wheel that said tensioning force of said motor also tensions said second belt means; a fourth pulley wheel, spaced from said third pulley wheel; third belt means, establishing driving relation between said third and fourth pulley wheels, said third pulley wheel being so positioned with respect to said first member, that force of said motor normally urging said first member in said one direction tensions said third belt means.

3. In a motion transmission apparatus, a first support, pivoted intermediate its extremities; a first shaft journalled adjacent one end of said support, and carrying a plurality of pulleys; a second shaft, spaced from said first shaft, carrying a pulley; first belt means trained over one of the pulleys of said first shaft and over the pulley of said second shaft; a second support, pivoted intermediate its ends to said first support adjacent the other end of said first support; a third shaft journalled adjacent one end of said second support, and carrying a plurality of pulleys; second belt means trained over one of said pulleys on said first shaft and one of said pulleys on said third shaft; a motor, pivotally mounted adjacent the other end of said second support, and being constructed and arranged to urge said one end of said second support away from said first shaft to tension said second belt means, and also move said first support in one direction about its pivot to tension said first belt means, said motor having a pulley; third belt means trained over said motor pulley and one of said pulleys on said third shaft, constructed and arranged to hold said motor in a position about its pivot wherein said motor pulley is normally urged away from said third shaft, so as to tension said third belt means.

4. In a motion transmission apparatus, a pivoted support; a motor pivoted to said support, and having wheel means; wheel means carried by said support intermediate the support pivot and the motor pivot; band means, trained over the wheel means carried by said support and said motor wheel means, constructed and arranged to hold said motor in an unbalanced position about its pivot wherein the motor wheel means is urged in a direction away from said support wheel means, thereby to tension said band means; other wheel means, spaced from said support wheel means; other band means, trained over said support wheel means and said other wheel means; the weight of said support and the motor and wheel means carried thereby providing a turning force urging said support to turn about its pivot in one direction, and said other wheel means being so positioned that the force urging said support to turn about its pivot tensions said other band means.

5. In combination: an electric motor having a stator and an armature having a shaft; pivoted supporting means; means fixedly mounting said stator on said supporting means; said supporting means being so constructed and arranged that said stator is swingable about the axis of said shaft whereby when said motor is energized said stator will so swing in a predetermined direction; rotatable driven means; means whereby mechanical power generated by said motor is transmissible from said motor shaft to said driven means; control means having limiting positions; means operatively connecting said stator to said control means; said connecting means being so constructed and arranged that when said motor is deenergized said control means is in one of its limiting positions and that when said motor is energized said stator swings in said predetermined direction about the axis of said shaft and moves said control means to its other limiting position wherein said control means and said connecting means prevent further swing of said stator in said direction thereby to permit said motor to transmit power to said driven means.

6. In a motion transmission apparatus, the combination of at least three shafts; at least two pivoted supporting means, including first pivoted supporting means, and second supporting means pivoted to said first supporting means; journal means, carried by said first and second supporting means, constructed and arranged to journal said at least three shafts respectively; wheel means carried by each of said shafts; band means so connecting said wheel means that power is transmissible from one of said shafts to the others of said shafts; and means, adapted to apply force to at least one of said shafts, so constructed and arranged as to tension all of said band means.

7. In a motion transmission apparatus, the combination of at least three shafts; at least two pivoted supporting means, including first pivoted supporting means, and second supporting means pivoted to said first supporting means; means, carried by said first and second supporting means, constructed and arranged to journal said at least three shafts respectively, one of said journal means being mounted for movement relatively to its supporting means; wheel means carried by each of said shafts; band means so connecting said wheel means that power may be successively transmitted from one of said shafts to the others of said shafts; and means, adapted to apply force to said one journal means, so constructed and arranged as to tension all of said band means.

8. In a motion transmission apparatus, the combination of at least three shafts; at least two pivoted supporting means, including first pivoted supporting means, and second supporting means pivoted to said first supporting means; means carried by said first and second supporting means, constructed and arranged to journal said at least three shafts respectively, one of said journal means being mounted for pivotal movement relatively to its supporting means; wheel means carried by each of said shafts; band means so connecting said wheel means that power may be successively transmitted from one of said shafts to the others of said shafts; and means, adapted to apply force to said one journal means, so constructed and arranged as to tension all of said band means.

9. In a motion transmitting device, a first support, carrying wheel means; a second support; means mounting said second support for pivotal movement; an electric motor having a stator and an armature having a shaft; means, carried by said second support, constructed and arranged to support said stator so that said stator may swing about the axis of said shaft; wheel means carried by said motor shaft; band means, trained over said support wheel means and said motor wheel means, so constructed and arranged that it serves as the sole means holding said second supporting in a position wherein the motor is in an unbalanced condition and urges said second support to swing about its pivot in a direction to tension said band means; control means; and means so constructed and arranged that when said stator swings about the axis of said shaft said control means is caused to be actuated, and so that said actuation leaves the position of the axis of said shaft substantially unchanged so that the tension on said band means remains substantially unchanged.

10. In combination: an electric motor having a stator and an armature having a shaft; pivoted supporting means; means fixedly mounting said stator on said supporting means; said supporting means being so constructed and arranged that said stator is swingable about the axis of said shaft whereby when said motor is energized said stator will so swing in a predetermined direction; rotatable driven means; means whereby mechanical power generated by said motor is transmissible from said motor shaft to said driven means; control means having predetermined positions; means operatively connecting said stator to said control means; said connecting means being so constructed and arranged that when said motor is deenergized said control means is in one of its predetermined positions and that when said motor is energized said stator swings in said predetermined direction about the axis of said shaft and moves said control means to another of its predetermined positions wherein said control means and said connecting means resist further swing of said stator in said direction thereby to permit said motor to transmit power to said driven means.

11. In combination: an electric motor having a stator and an armature having a shaft; first pivoted supporting means; means fixedly mounting said stator on said first supporting means; said first supporting means being so constructed and arranged that said stator is swingable about the axis of said shaft; control means having limiting positions; means connecting said stator to said control means; said connecting means being so constructed and arranged that when said motor is deenergized said control means is in one of its limiting positions and when said motor is energized said stator swings about the axis of said shaft in a direction to move said control means to its other limiting position wherein said control means and said connecting means act to prevent further swing of said stator in said direction; second supporting means including first pivot means for supporting said first supporting means; said second supporting means including also second pivot means, eccentric to said first pivot means, and being so constructed and arranged that said first supporting means and said motor are biased to swing about said second pivot means; rotatable driven means; driving means on said shaft; and power transmitting means connecting said driving means and said driven means, said power transmitting means being so constructed and arranged that it limits swing of said second supporting means and said motor about said second pivot means in the direction of said bias whereby said power transmitting means is placed under tension.

12. In combination: an electric motor having a stator and an armature having a shaft; first pivoted supporting means; means fixedly mounting said stator on said first supporting means; said first supporting means being so constructed and arranged that said stator is swingable about the axis of said shaft; control means having predetermined positions; means connecting said stator to said control means; said connecting means being so constructed and arranged that when said motor is deenergized said control means is in one of its predetermined positions and when said motor is energized said stator swings about the axis of said shaft in a direction to move said control means to another of its predetermined positions wherein said control means and said connecting means act to resist further swing of said stator in said direction; second supporting means including first pivot means for supporting said first supporting means; said second supporting means including also second pivot means, eccentric to said first pivot means, and being so constructed and arranged that said first supporting means and said motor are biased to swing about said second pivot means; rotatable driven means; driving means on said shaft; and power transmitting means connecting said riving means and said driven means, said power transmitting means being so constructed and arranged that it limits swing of said second supporting means and said motor about said second pivot means in the direction of said bias whereby said power transmitting means is placed under tension; said connecting means being so constructed and arranged that said movement of said control means leaves the position of the axis of said shaft substantially unchanged so that the tension on said transmitting means remains substantially unchanged.

13. In combination: an electric motor having a stator an armature having a shaft; pivoted supporting means, including a platform suspended from pivoted spaced side members; means fixedly mounting said stator on said platform; said supporting means being so constructed and arranged that said stator is swingable about the axis of said shaft whereby when said motor is energized said stator will so swing in a predetermined direction; rotatable driven means; means whereby mechanical power generated by said motor is transmissible from said motor shaft to said driven means; control means having predetermined positions; means operatively connecting said stator to said control means; said connecting means being so constructed and arranged that when said motor is deenergized said control means is in one of its predetermined positions and that when said motor is energized said stator swings in said predetermined direction about the axis of said shaft and moves said control means to another of its predetermined positions wherein said control means and said connecting means resist further swing of said stator in said direction thereby to permit said motor to transmit power to said driven means.

14. In combination: an electric motor having a stator and an armature having a shaft; first pivoted supporting means, including a platform suspended from pivoted spaced side members; means fixedly mounting said stator on said platform; said first supporting means being so constructed and arranged that said stator is swingable about the axis of said shaft; control means having limiting positions; means connecting said stator to said control means; said connecting means being so constructed and arranged that when said motor is deenergized said control means is in one of its limiting positions and when said motor is energized said stator swings about the axis of said shaft in a direction to move said control means to its other limiting position wherein said control means and said connecting means act to prevent further swing of said stator in said direction; second supporting means including first pivot means for pivotally supporting said side members; said second supporting means including also second pivot means, eccentric to said first pivot means, and being so constructed and arranged that said first supporting means and said motor are biased to swing about said second pivot means; rotatable driven means; driving means on said shaft; and power transmitting means connecting said driving means and said driven means, said power transmitting means being so constructed and arranged that it limits swing of said second supporting means and said motor about said second pivot means in the direction of said bias whereby said power transmitting means is placed under tension.

JOHN HORNACK.